United States Patent Office 3,618,386
Patented Nov. 9, 1971

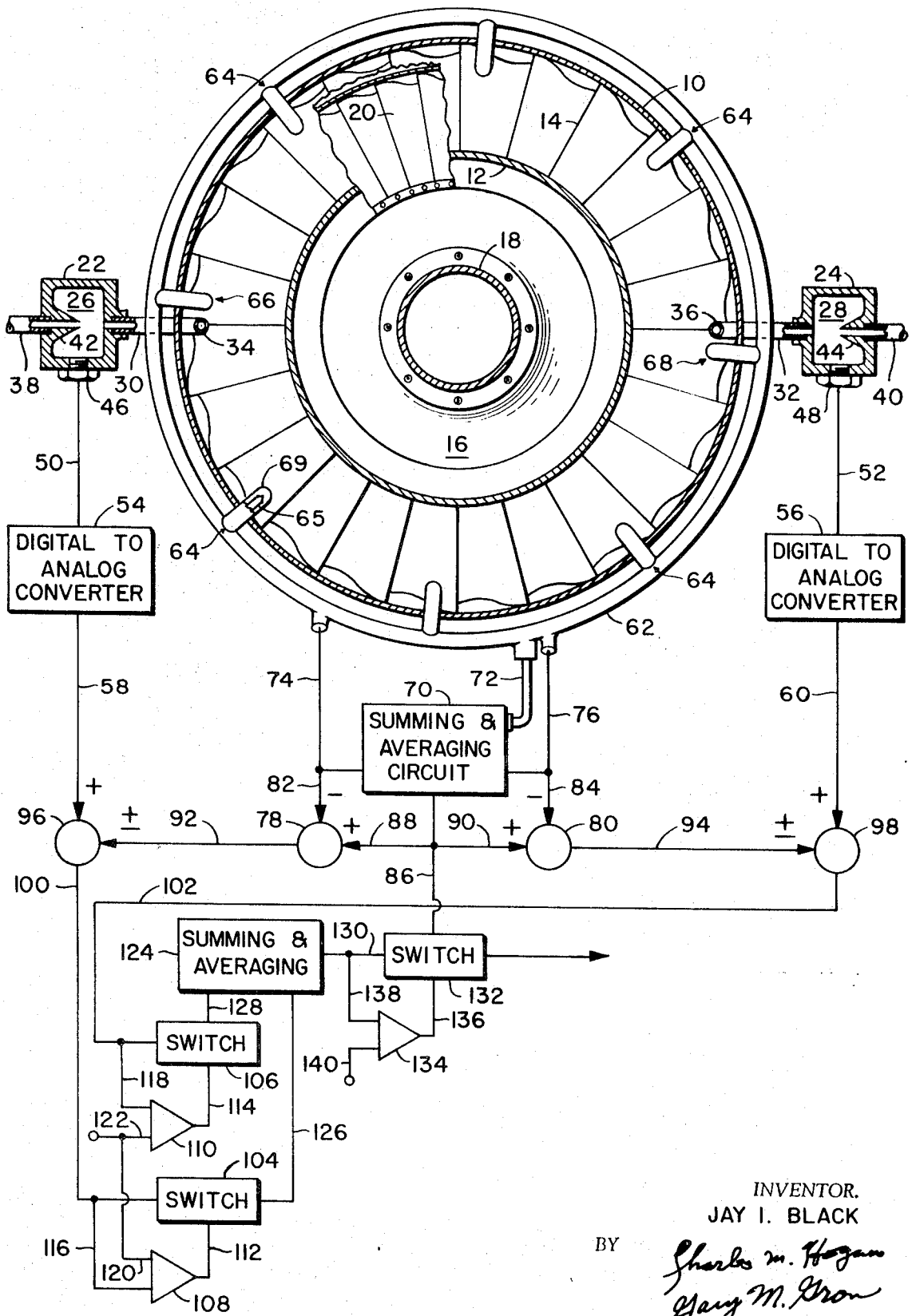

3,618,386
FLUIDIC TEMPERATURE SENSOR AVERAGING SYSTEM
Jay I. Black, Orange, Conn., assignor to Avco Corporation, Stratford, Conn.
Filed June 10, 1970, Ser. No. 44,979
Int. Cl. G01k *3/06, 11/22*
U.S. Cl. 73—340                                  6 Claims

ABSTRACT OF THE DISCLOSURE

Simplified fluidic temperature sensor assembly for measuring average turbine inlet temperature of a gas turbine engine. The system comprises a pair of fluidic oscillators positioned at the inlet to a turbine nozzle of a gas turbine engine. The output from the oscillators is modified in proportion to the difference in signal between thermocouples adjacent the oscillators and the signal reflecting an average temperature produced by a thermocouple harness assembly. A device is provided in the system to switch out the output of the oscillators and use the thermocouple harness output when a failure is indicated in both of the fluidic oscillators.

---

The present invention relates to fluidic temperature sensors and more specifically to sensors of this type for use in gas turbine engines.

One of the problems that arise with such an application is that the fluidic oscillator essentially measures the temperature at a particular circumferential position in a fluid stream that may have widely varying circumferential temperature gradients. The particular temperature at the point of measurement may be at a hot spot or a cold spot. In either case this reflects an inaccurate reading that is not truly representative of the average temperature in the fluid stream.

It has been proposed to solve this problem by positioning a plurality of fluidic temperature sensors around the annulus of a gas turbine engine flow path and utilizing an appropriate system to measure and average the output from these sensors. While this does an effective job, it increases the cost of such a system to a high degree because of the additional fluidic oscillators and the complicated circuitry required to average their output.

Accordingly, it is an object of the present invention to provide a fluidic temperature sensor system for a gas turbine engine which is effectively, simply and efficiently corrected to produce an output which reflects an average fluid stream temperature.

The above objects are achieved by providing a fluidic temperature sensor system for a gas turbine engine. The fluidic temperature sensor comprises at least one fluidic oscillator positioned to receive gas from the fluid stream at a particular circumferential location and to produce pressure oscillations proportional to the temperature of the fluid received by the oscillator. A thermocouple is positioned adjacent the fluidic oscillator so as to be exposed to the same temperature as the fluidic oscillator. The output from the thermocouple is compared to the average from a plurality of thermocouples positioned around the circumference of the fluid stream and the resultant difference is used to correct the output of the fluidic oscillator to produce a signal reflecting an average fluid temperature.

The above and other related objects and features of the present invention will be apparent from a reading of the description shown in the accompanying drawings and the novelty thereof pointed out in the appended claims.

The single figure illustrates a fluidic temperature sensor embodying the present invention, together with pertinent portions of a gas turbine engine.

Referring to the drawing, there is shown a cross section of the pertinent portion of a gas turbine engine with which the present invention may be used. An outer casing 10 for the engine also forms the outer boundary of an annular flow path for a hot motive fluid stream discharged from a combustor (not shown) located upstream of the illustrated assembly. The generation of the hot gas stream through ignition of a mixture of fuel and air is so well known to those skilled in the gas turbine art that a detailed description of the components that generate this hot gas stream is unnecessary in describing the present invention.

The inner bounds of the annular flow path from the combustor is defined by an inner duct 12. A series of generally radially extending vanes 14 are mounted between casing 10 and duct 12 to form a nozzle assembly for a turbine disk 16 mounted to a rotatable shaft 18 and having a plurality of blades 20.

The measurement of temperature to the inlet of this turbine nozzle assembly is accomplished by a temperature sensing system comprising fluid oscillators 22, 24 located 180° from one another. Before discussing the details of the oscillators 22, 24 it is pointed out that the two oscillators are provided for redundant purposes only. The system described works with equal advantage when only one oscillator is used. Redundancy is provided to enable continuous sensing if one of the oscillators should fail. The oscillators 22, 24 each have a resonant chamber 26, 28 fed with hot motive fluid from inlet conduits 30, 32 having inlets 34, 36 in the motive fluid stream of the gas turbine engine. The oscillators have outlets 38, 40 connected to sufficiently low pressure sources to cause a flow of motive fluid through the resonant chambers 26, 28 toward the outlets 38, 40. Splitters 42, 44 in the resonant chambers 26, 28, respectively, cause the flow in the chambers to set up pressure oscillations.

The frequency of these pressure oscillaions is directly a function of the temperature of the gas in the chambers 26 and 28. This pressure oscillation is converted into an electrical signal by transducers 46, 48, such as a piezoelectric type which provides an electrical output signal on lines 50, 52 whose frequency is directly related to the frequency of the pressure oscillations in the resonant chambers 26, 28 respectively. The frequency signals on lines 50, 52 are fed to digital to analog converters 54, 56.

These converters may take the form of electronic circuits which filter the frequency signal. This smooths the signal for connection with a square wave generator that produces square wave output pulses irrespective of the input amplitude. From there the signal is differentiated and then integrated to produce a D.C. output signal on lines 58–60, respectively, directly proportional to the temperature signal from the oscillators 22, 24.

As pointed out above the oscillators 22, 24 measure the temperature at only two positions around the entire circumference of the annular flow path leading into the turbine nozzle assembly. In order to provide a resultant signal reflecting an average measurement, the following circuit is employed.

A thermocouple harness assembly 62 has a plurality of thermocouple probes 64 positioned to extend into the motive fluid stream around the circumference of the inlet to the turbine nozzle at approximately the same station as the fluidic oscillators 26, 28. The probes 64 each comprise a junction 65 encased in an insulating material such as aluminum oxide and surrounded by an exterior casing 69 of a high temperature resistant material that can withstand turbine inlet temperatures for prolonged periods of time. Thermocouple probes 66 and 68 are similarly constructed. In addition, the thermocouple harness 62 has probes 66, 68 which extend into the motive fluid stream immediately adjacent the inlets 34, 36, respectively, of the fluidic oscillator 22, 24.

As will be apparent to those skilled in the art, the thermocouple probes 64, 66 and 68 produce a D.C. voltage output proportional to the temperature of the motive fluid stream. The signals from probes 64, 66 and 68 are fed to a summing and averaging circuit 70 via cable 72 and lines 74, 76, respectively. The summing and averaging circuit 70 may be one of a number of well-known type of circuits that receives the output from the thermocouple and produces a resultant signal which is the average of the individual thermocouple readings. Circuits which are illustrative of this type may be found in patents to R. J. Smith, No. 2,996,916, and the patent to M. V. Braunagel, No. 3,053,091.

The signals from thermocouple probes 66, 68 additionally are applied to summing devices 78, 80 via lines 82-84, respectively. The summing devices may take the form of high gain proportional amplifiers as will be apparent to those skilled in the art. The signal representing the average thermocouple harness temperature is applied to the summing devices 78, 80 via lines 88-90, respectively. The summing devices 78 and 80 are adapted to produce output signals on lines 92 and 94 reflecting the difference between the signals from the thermocouple probes 66, 68 and the average thermocouple signal from circuit 70.

The signals on lines 58 and 92 are applied to a summing device 96 and the signals on lines 60 and 94 applied to a summing device 98. The summing devices 96 and 98 may be high gain proportional amplifiers adapted to correct the temperature signals from the fluidic oscillators in proportion to the difference between the signals from the thermocouples adjacent the oscillators and the average thermocouple temperature signal.

It should be apparent to those skilled in the art that the various summing and averaging devices are adjusted so that there is a correction of the oscillator signal in direct proportion to its difference from the average temperature around the turbine inlet, as determined by the thermocouple system.

Using oscillator 22 as an example, its temperature signal is reduced if the output from thermocouple probe 66 is greater than the average thermocouple temperature signal. An opposite difference would cause the oscillator signal to be increased.

The corrected temperature output signals from summing devices 96 and 98 are fed via lines 100 and 102 to switches 104 and 106, respectively. Switches 104 and 106 are actuated by amplifiers 108, 110 through output lines 112 and 114, respectively. Amplifiers 108 and 110 receive inputs from lines 100 and 102 via lines 116 and 118. The inputs from these lines are compared to a minimum input signal on lines 120, 122 which reflects a minimum normal operating signal from oscillators 22 and 24. The amplifiers 108 and 110 actuate switches 104 and 106 to pass a signal only when the signals on lines 100 and 102 are above the minimum input signal on lines 120 and 122.

The signals from switches 104 and 106 are applied to a summing and averaging device 124 via lines 126 and 128. This device may be a high gain proportional amplifier which produces a signal on line 130 that is an average of the corrected temperatures from oscillators 22 and 24.

A switch 132, actuated by an amplifier 134 via line 136, is interposed in output line 130. The switch 132 receives an alternate input from the thermocouple temperature averaging circuit via line 86. The amplifier 134 receives a signal input from line 130 via line 138 and from a minimum input signal source (not shown) via line 140. The switch 132 is actuated to pass a signal from averaging device 124 whenever the signal on line 130 is above the minimum input signal level which reflects normal operation of the oscillators 22 and 24. Whenever the signal on line 130 is below the minimum level, amplifier 134 actuates switch 132 to cut off the signal from line 130 and pass the signal from line 86.

In operation the sensors 22, 24 produce output signals reflecting the motive fluid stream temperature at the location of the oscillators. These signals are corrected by the comparison of the signals from the thermocouples located immediately adjacent the oscillators to the average signal from the thermocouples 64 around the circumference of the flow path. The resultant correction modifies the signal from the fluidic oscillators to provide an output signal truly reflecting the average temperature at the inlet to the turbine nozzle.

When both oscillators 22 and 24 are functioning normally the switches 104, 106 and 132 pass the corrected oscillator signal. For example, if oscillator 22 fails, switch 104 terminates its signal and the resultant output is the corrected signal for oscillator 24. If both oscillators 22 and 24 fail, switch 132 cuts out their signal and passes the signal from the thermocouple averaging circuit 70. Therefore, the oscillators provide the output signal for normal operation but the thermocouple averaging circuit 70 provides the output signal on a standby basis if both oscillators fail.

The above temperature sensing system has the advantage of providing an output signal that can be used for accurate steady state control while still retaining the extremely fast response time of the fluidic oscillator during transient operation. In this connection it is pointed out that the thermocouples are designed as ruggedly as necessary to withstand the temperatures of the turbine inlet. Even though the rugged construction necessary for this location seriously affects the response time of the thermocouple, this does not affect the ability of the system to respond rapidly to temperature transients. The reason for this is that the fluidic oscillator signals are only corrected by the signals from the thermocouple and the resultant signal reflects the rapid response time of the fluidic ocsillator.

It is pointed out that the cost of providing a rugged thermocouple harness and averaging system is far less than the cost of providing a plurality of fluidic oscillators and the necessary summing and averaging circuits. In addition, the system provides for emergency indication by the thermocouple system in the event of failure of both of the oscillators 22, 24. The mode of failure that might affect a fluidic oscillator, i.e., blockage of the small fluid flow passages by coke particles, could on occasion affect a plurality of oscillators, simultaneously. The redundant thermocouple system would not be affected by "coking." Therefore, this system provides for complete failsafe operation which is consistent with present day aircraft practices.

While the above system has been described in connection with the turbine inlet of a gas turbine engine, it will be apparent to those skilled in the art that the system may be used with equal advantage in other locations in the gas turbine engine. Therefore, the spirit and scope of the present invention should be determined solely by the appended claims.

Having thus described the invention, what is claimed as novel and desired to be secured by Letters Patent of the United States is:

1. Apparatus for measuring the average temperature of an annular motive fluid stream at a given station in a gas turbine engine, said apparatus comprising:
   at least one fluidic oscillator comprised of: a housing with a resonant chamber formed therein, an inlet connected to said motive fluid stream at said given station, and an outlet extending to a discharge having a pressure level sufficiently lower than said inlet whereby pressure oscillations proportional to the temperature of said motive fluid stream are set up;

means for generating a signal proportional to said pressure oscillations;

a thermocouple positioned adjacent the inlet to said oscillator for generating a temperature output signal proportional to the temperature adjacent the inlet of said oscillator;

a plurality of thermocouples positioned around the annular motive fluid stream at said station for generating a temperature output signal proportional to the average motive fluid stream temperature at said station;

means for correcting the signal from said fluidic oscillator as a function of the difference between the temperature signal of said thermocouple and the average temperature signal of said plurality of thermocouples, thereby producing a signal proportional to the average motive fluid stream temperature at said station.

2. Apparatus as in claim 1 adapted for use in measuring relatively high temperatures and further comprising means for forming protective casings around said thermocouple junctions that the thermocouple junctions are able to operate at elevated temperatures for a sustained period of time.

3. Apparatus as in claim 1 wherein said means for generating a signal proportional to said pressure oscillation comprises a transducer exposed to said resonant chamber for providing an electrical frequency output signal and means for converting said output signal to a D.C. signal proportional to the frequency of the pressure oscillations in said resonant chamber.

4. Apparatus as in claim 3 wherein all of said thermocouples generate a D.C. electrical signal and said correcting means comprises:

means for generating a D.C. electrical signal proportional to the average temperature output signal from said plurality of thermocouples;

means for algebraically summing the output signal from said thermocouple adjacent the inlet to said oscillator and the average of said plurality of said thermocouples for producing an error correction signal;

means for algebraically summing the D.C. signal from said oscillator with said error correction signal for producing a corrected output signal reflecting the average motive fluid stream temperature.

5. Apparatus as in claim 4 wherein said system further comprises:

means receiving said corrected output signal for selectively passing the output from said thermocouple temperature averaging means only in the absence of a signal from said oscillator;

whereby said thermocouple average temperature signal is used for an output signal on a standby basis.

6. Apparatus as in claim 5 comprising a pair of oscillators, and wherein:

said output switch is adapted to pass the thermocouple temperature averaging signal only when both of said oscillators have failed.

References Cited
UNITED STATES PATENTS 2,582,232   1/1952   Cesaro    73—339 A
3,509,768   5/1970   Reynolds   73—346

LOUIS R. PRINCE, Primary Examiner

D. E. CORR, Assistant Examiner

U.S. Cl. X.R.

73—339 A, 341